Oct. 16, 1934.  A. A. KRAMER  1,977,390
BALANCED VALVED THIEF HOLE COVER
Filed April 2, 1931
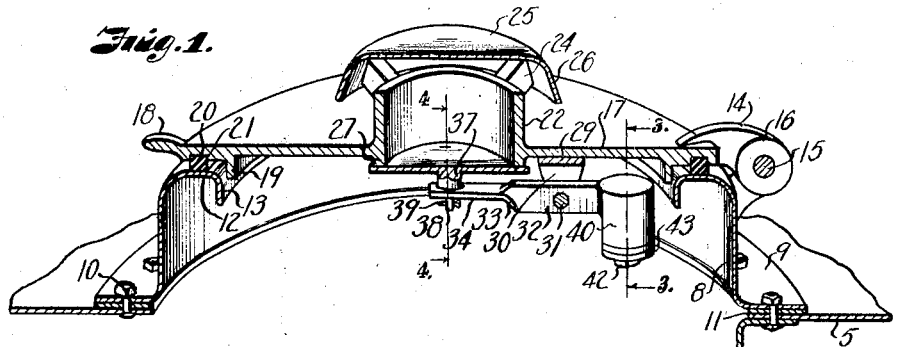
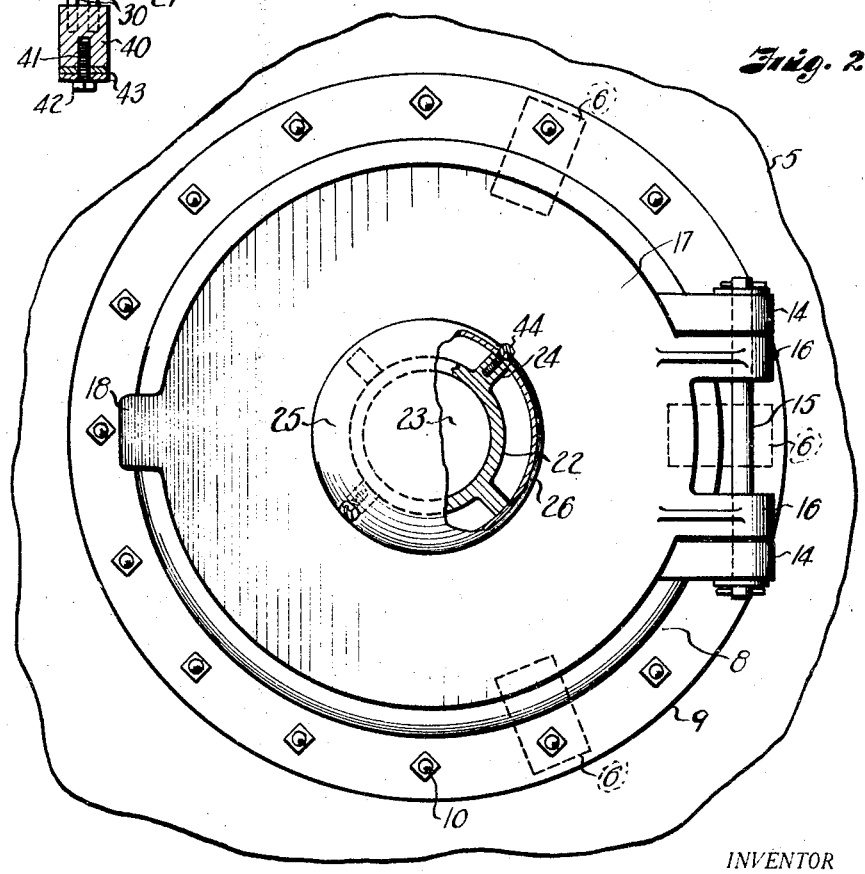
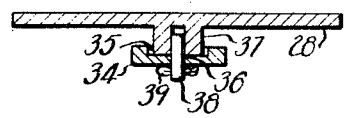
INVENTOR
Andrew A. Kramer
BY
Alfred R. Fuchs
ATTORNEY Patented Oct. 16, 1934

1,977,390

UNITED STATES PATENT OFFICE 1,977,390

BALANCED VALVED THIEF-HOLE COVER

Andrew A. Kramer, Kansas City, Mo.

Application April 2, 1931, Serial No. 527,225

10 Claims. (Cl. 220—44)

My invention relates to valved closure members for openings in decks or roofs of tanks such as manholes or thief-holes, and more particularly to a valved thief-hole cover and a balanced valve member therefor. It is a purpose of my invention to provide a cover member which is movable toward and away from a base member with an inwardly opening valve member, which is substantially balanced so as to open inwardly when a very slight vacuum occurs within the tank or other vessel upon which the same is mounted. The valve member is only slightly overbalanced so as to be held in engagement with the seat by the action of gravity.

It is a particular purpose of my invention to provide a vacuum relief valve for tanks particularly adapted for use on hatches or covers for manholes and thief-holes, which is of a disk-like form and which is mounted on a lever in such a manner that weight carried by said lever will urge the valve toward its seat, the weight being adjustable so as to apply any desired pressure of the valve on the seat, but being so adjusted in practice that the same will be only slightly overbalanced to urge the valve toward the seat only sufficiently to hold the same seated so that the same will be unseated by a very small reduction of pressure below atmospheric pressure in the tank.

Due to the disk-like structure of the valve, when the pressure within the tank increases above atmospheric pressure the disk-like valve will tend to remain seated, and said cover is provided with a sealing member between itself and the base of the manhole or thief-hole dome, or collar-like member, normally held in sealing position due to the weight of the cover, and the cover being movable due to the pressure within the tank to unseat the valve thus formed by said cover in combination with the base to permit the gases within the tank to escape until the pressure falls to the point where the weight of the cover will again act to hold the same in closed position.

Thus, a pressure and vacuum relief valve is provided that is entirely operable by the action of gravity, and which is springless. It is one of the purposes of the invention to provide a thief-hole or manhole cover which comprises a pressure relief and vacuum relief valve in which all springs are eliminated.

Other objects and advantages of my invention will appear as the description of the drawing proceeds. I desire to have it understood, however, that I do not intend to limit myself to the particular details of structure shown or described, except as defined in the claims.

In the drawing:

Fig. 1 is a view partly in vertical section and partly in perspective of my improved balanced valved thief-hole or manhole cover.

Fig. 2 is a top plan view thereof, showing a fragment of the tank, a portion of the cover member being broken away and being partially in section.

Fig. 3 is a fragmentary section taken on the line 3—3 of Fig. 1, and

Fig. 4 is a section on an enlarged scale taken on the line 4—4 of Fig. 1.

Referring in detail to the drawing, my improved balanced valve means is shown as being applied to a thief-hole of a tank, such as an oil tank having the roof or deck 5, which is provided with depending brackets 6, upon which a shelf 7 for a thieving or gauging bucket is secured by welding or in any other suitable manner. A dome-like member 8 comprising the body portion of the thief-hole and having an outwardly extending flange 9 bolted to the deck 5 by means of the bolts 10, is mounted on said deck with a packing 11 of compressible material mounted between the flange 9 and the deck sheet 5. The dome-like member 8 is shown of sheet metal, but may be made in any other desired manner, or of any other desired metallic material, as preferred. The dome-like member 8 is provided with an inwardly directed annular flange portion 12 around the top thereof, terminating in a depending annular lip 13, the upper surface of the flange 12 providing a valve seat. The body portion 8 is provided with a pair of hinge ears 14, through which the hinge pin 15 passes, the ears 16 of the cover member 17 being pivoted on the hinge pin 15 and the cover member 17 thus having pivotal movement toward and away from the body portion 8.

The cover member 17 is provided with a lip 18, which may be engaged by the hand or foot of the operator to raise the cover member 17 when it is desired to obtain access to the interior of the tank, and is also provided with a depending annular lip or flange 19 which is of smaller diameter than the flange or lip 13 and lies inwardly of the same to guide the cover into proper closing relation relative to the body portion 8. A compressible gasket member 20 is mounted in an annular groove 21 in the cover member 17 and engages the upper surface of the inwardly directed flange 12 on the body portion 8 in normal closing position of the cover 17, the gasket 20 being held in sealing relation to the flange 12 by the weight of the cover 17. The weight of the cover is made such that the pressure of the gases within the tank as the same increase, will lift the cover 17 so as to disengage the gasket 20 from the seat 12 and permit the escape of gases to relieve the pressure within the tank when only a relatively small amount of pressure exists within the tank, thus maintaining a condition of substantially no appreciable pressure within the tank at all times.

As the pressure conditions within the tank vary both above and below atmospheric pressure, depending on the temperature of the contents of the tank, the cover is also provided with means for breaking or relieving the vacuum within the tank.

The cover member is provided with an upstanding annular flange 22 surrounding an opening 23, and is provided with a plurality of lugs or fins 24 extending outwardly therefrom, and upon the outer ends of which is mounted a cover member 25 of aluminum or similar material which has an outwardly flaring depending flange 26 thereon, the member 25 with its flange 26 and the collar or flange 22 serving as an effective shield to prevent rain or snow from entering the opening 23.

The cover member 17 is further provided with a depending annular flange or rib 27, aligned substantially with the flange 22 and preferably ground on its under surface to form a valve seat with which the valve member 28 engages. The cover member 17 is further provided with a fulcrum member 29 bolted or otherwise secured to the under side of the cover member 17, and having a pair of ears 30 thereon in which the pivot pin 31 is mounted. A lever 32 is pivotally mounted on the pin 31, the same being made of a piece of bar or strap iron, which is twisted at 33 so as to dispose the valve carrying end portion 34 thereof in substantial parallelism to the valve 28, the same being provided with a bore or opening comprising a portion 35 of relatively large diameter and a portion 36 of small diameter, said larger portion 35 forming a socket for loosely receiving the boss 37 on the valve 28, said boss having an opening into which the pin or valve stem 38 engages with a drive fit; said pin or stem 38 fitting loosely in the portion 36 of the bore in the end 34 of the lever, the valve being held in assembled position on the lever by means of a cotter-pin 39.

The end of the lever 32 opposite the valve 38 is provided with a counter-weight 40 welded or otherwise permanently secured thereto. The counter-weight is provided with a threaded opening 41, with which the set screw 42 is threadedly engaged, the set screw being provided for the purpose of adjusting the counter-weight by the addition of a suitable washer or washers 43 thereto, the same being held detachably on the main weight 40 by means of said set screws. The weight 40 is made so as to slightly overbalance the weight of the valve 28 to hold the same in engagement with the seat 27 in such a manner that an extremely small amount of vacuum will unseat the valve 28.

In view of this fine adjustment of the valve 28, means for adjustment of the weight 40 is provided so that in case the valve 28 is not held seated sufficiently to provide a closure when the pressure in the tank is not less than the atmosphere, the adjusting means comprising the set screw 42 and the washers 43 are provided so that the necessary number of washers may be added to get the proper slightly overbalanced relation between the weight on one side of the pivot member 31 relative to the weight on the other side thereof on which the valve 28 is located.

It will be obvious that due to the area of the valve 28, pressure within the tank as the same increases will tend to seat the same more tightly on the seat 27, and for that reason all that is needed to assure engagement of the valve 28 with the seat 27 is to have a condition in which the valve 28 is substantially counter-balanced by the weight 40 or the adjusting weights 43, being only very slightly overbalanced to accomplish the seating. The shield or cover 25 is detachably mounted on the cover 24 by means of the screw threaded fastening elements 44.

Having thus described my invention what I claim is:—

1. The combination with a tank deck of a thief-hole comprising a dome-like member having an opening therein aligning with an opening in said tank deck, a bracket secured to said deck adjacent the edge of said opening and depending below said deck and a shelf fixed on said bracket and extending in spaced relation to the deck below the same and partially across the space aligning with said opening from one side thereof and a cover member hinged to said dome-like member on the side thereof adjacent said bracket.

2. In a thief-hole cover having an opening therein, a barrier around said opening on the outside of said cover, a hood over said opening, having a depending flange overlapping said barrier, a valve seat surrounding said opening on the inside of said cover, a lever pivoted between its ends on the inner side of said cover, a disk valve on one end of said lever having a flat top face engaging said seat; and an adjustable means on the other end of said lever slightly overbalancing said valve, said lever having a shouldered bore therein to provide a portion of small diameter and said valve having a depending boss loosely seated in the larger portion of said bore, a pin fixed in said valve extending loosely through the smaller portion of said bore and means for securing said pin to said lever.

3. In a device of the character described, a base member, a cover member hinged thereto, sealing means seated in one of said members and engaging the other member, said cover member having a wide unobstructed opening therein, a tubular flange projecting from opposite faces of said cover member surrounding said opening to form a valve seat on the under side of said cover member surrounding said opening and a barrier on the upper side of said cover member surrounding said opening, a rigid flat-topped disk valve engaging said valve seat, a lever pivoted on said cover member between said opening and said hinge and carrying said valve, a counterweight for holding said valve in engagement with said seat and means loosely, tiltably securing said valve and said lever together.

4. In a device of the character described, a base member, a cover member hinged thereto, sealing means seated in one of said members and engaging the other member, said cover member having a wide unobstructed opening therein, a tubular flange projecting from opposite faces of said cover member surrounding said opening to form a valve seat on the under side of said cover member surrounding said opening and a barrier on the upper side of said cover member surrounding said opening, a rigid flat-topped disk valve engaging said valve seat, a lever pivoted on said cover member carrying said valve, a counterweight for holding said valve in engagement with said seat and means loosely securing said valve and said lever together, for slight universal tilting movement of said valve on said lever.

5. In a device of the character described, a base member having an upstanding side wall, a top wall having an opening therein, a depending flange surrounding said opening, a cover member hinged thereto, sealing means seated in one of said members and engaging the other member, said cover member having a wide unobstructed opening therein, a tubular flange projecting from opposite faces of said cover member surrounding said opening to form a valve seat on the under side of said cover member surrounding said opening and a barrier on the upper side of said cover member surrounding said opening, a depending flange on said cover member spaced inwardly from the peripheral edge thereof telescopically cooperating with the depending flange on said base member, a rigid flat topped disk valve engaging said valve seat, a lever pivoted on said cover member carrying said valve, a counterweight for holding said valve in engagement with said seat and means loosely tiltably securing said valve and said lever together.

6. In a device of the character described, a base member, a cover member hinged thereto, sealing means seated in one of said members and engaging the other member, said cover member having a wide opening therein, a tubular flange projecting from opposite faces of said cover member surrounding said opening to form a valve seat on the under side of said cover member surrounding said opening and a barrier on the upper side of said cover member surrounding said opening, upwardly and outwardly directed fins on said barrier having inclined outer faces, a cup-like head mounted on said fins in spaced relation to said barrier, said head having an outwardly and downwardly inclined annular wall thereon embracing said fins, securing means extending from externally of said head into said fins for fastening said wall to the outer faces of said fins, a valve engaging said seat and means for holding said valve in engagement with said seat.

7. In a thief-hole cover having an opening therein, a valve seat projecting downwardly around said opening, a disk valve having a flat top face engaging said seat, pivot ears depending from said cover, a lever pivoted on said ears, means for detachably mounting said disk valve on one end of said lever so as to lie above the same, and means for slightly overbalancing said valve, to hold it against its seat, on the other end of said lever, said means comprising a main weight permanently fixed in position on said lever, supplemental weights smaller than said main weight and means for detachably clamping said supplemental weights in fixed position on said main weight.

8. In a tank, a thief-hole comprising a dome-like member having an opening therein, a bracket depending below said dome, a shelf on said bracket extending into alignment with only one side of said dome opening, and a cover hinged to said dome on the side thereof provided with said shelf.

9. In a tank, a thief-hole comprising a dome-like member having an opening therein, a cover hinged to said dome on one side thereof and valved vent means carried by said cover, comprising a valve seat adjacent the center of said cover, a lever, a valve on one end of said lever engaging said seat, pivot ears for said lever depending from said dome on the hinged side thereof and a counter-weight for said valve on the other end of said lever, said counter-weight being spaced inwardly from the periphery of said cover to clear said dome upon hinging movement of said cover.

10. In a device of the character described, a member having an opening therein, a downwardly projecting valve seat surrounding said opening, a lever pivoted between its ends on the under side of said member, said pivot being spaced from said opening, a rigid disk valve member having a flat top face adapted to engage said seat, said valve having a boss projecting from the lower face thereof and said lever having a recess therein adjacent one end thereof loosely receiving said boss, a pin projecting downwardly from said boss, said lever having an opening therein extending from the bottom of said recess and loosely slidably receiving said pin, means for holding said valve engaged with said lever, and adjustable means on the other end of said lever slightly overbalancing said valve to urge it upwardly toward said seat.

ANDREW A. KRAMER.